United States Patent
Hanrieder et al.

(10) Patent No.: US 9,333,589 B2
(45) Date of Patent: May 10, 2016

(54) COMPONENT AND METHOD FOR JOINING METAL ELEMENTS

(75) Inventors: Herbert Hanrieder, Hohenkammer (DE); Alexander Gindorf, Schwabhausen (DE); Reinhold Meier, Dorfen (DE)

(73) Assignee: MTU Aero Engines GmbH, Munich (DE)

(*) Notice: Subject to any disclaimer, the term of this patent is extended or adjusted under 35 U.S.C. 154(b) by 1415 days.

(21) Appl. No.: 12/225,350

(22) PCT Filed: Mar. 14, 2007

(86) PCT No.: PCT/DE2007/000456
§ 371 (c)(1),
(2), (4) Date: Sep. 19, 2008

(87) PCT Pub. No.: WO2007/107144
PCT Pub. Date: Sep. 27, 2007

(65) Prior Publication Data
US 2010/0158691 A1 Jun. 24, 2010

(30) Foreign Application Priority Data
Mar. 20, 2006 (DE) .................. 10 2006 012 660

(51) Int. Cl.
*B23K 13/01* (2006.01)
*H05B 6/22* (2006.01)
(Continued)

(52) U.S. Cl.
CPC ............ *B23K 20/021* (2013.01); *F01D 5/3061* (2013.01); *B23K 2201/001* (2013.01); *F05D 2230/232* (2013.01); *Y10T 428/12493* (2015.01)

(58) Field of Classification Search
CPC B23K 20/21; B23K 2201/001; F01D 5/3061; F05D 2230/232; Y10T 428/12493
USPC .......... 219/617, 602, 603, 612–616, 659, 672
See application file for complete search history.

(56) References Cited

U.S. PATENT DOCUMENTS 3,697,718 A * 10/1972 Von Hollen et al. ............ 219/62
4,012,616 A * 3/1977 Zelahy .......................... 219/603
(Continued)

FOREIGN PATENT DOCUMENTS

| DE | 198 58 702 | 1/2004 |
|---|---|---|
| EP | 1 516 690 | 3/2005 |

(Continued)

OTHER PUBLICATIONS

International Search Report issued in corresponding Intl. Patent Application PCT/DE2007/000456.

*Primary Examiner* — Hung D Nguyen
(74) *Attorney, Agent, or Firm* — Davidson, Davidson & Kappel, LLC

(57) ABSTRACT

A component, in particular a component of a gas turbine, is described composed of at least two metallic structural elements, the first structural element having a first joining surface, and the second structural element having a second joining surface, and the structural elements being joined via their joining surfaces by an inductive high-frequency pressure welding. One of the joining surfaces is shaped to widen peripherally in comparison to the other joining surface, and an upsetting deformation produced in a join region in response to the joining of the structural elements rests virtually entirely within and, in particular, on a peripheral collar formed by the peripheral widening of the one joining surface. A method is described for joining metallic structural elements, in particular structural elements of a gas turbine, an inductive high-frequency pressure welding being used to join corresponding joining surfaces of the structural elements.

23 Claims, 2 Drawing Sheets

(51) Int. Cl.
  *B23K 20/02*   (2006.01)
  *F01D 5/30*   (2006.01)

(56) References Cited

U.S. PATENT DOCUMENTS

| | | | | |
|---|---|---|---|---|
| 4,300,031 | A | * | 11/1981 | Reboux et al. ............... 219/617 |
| 4,456,803 | A | * | 6/1984 | Kaneda et al. ............... 219/612 |
| 4,873,751 | A | * | 10/1989 | Walker et al. ............... 29/889.1 |
| 4,883,216 | A | | 11/1989 | Patsfall ........................ 228/119 |
| 4,916,278 | A | * | 4/1990 | Rudd et al. .................. 219/602 |
| 5,048,743 | A | * | 9/1991 | Walker et al. ............... 228/44.3 |
| 6,160,237 | A | * | 12/2000 | Schneefeld et al. ....... 219/78.02 |
| 6,438,838 | B1 | | 8/2002 | Meier et al. .................. 29/889.1 |
| 6,438,839 | B1 | * | 8/2002 | Hardesty et al. ............... 29/890 |
| 6,616,408 | B1 | | 9/2003 | Meier ........................ 416/193 A |
| 7,125,227 | B2 | | 10/2006 | Adde et al. ................ 416/213 R |
| 2005/0098608 | A1 | * | 5/2005 | Adde et al. .................. 228/112.1 |
| 2005/0193545 | A1 | * | 9/2005 | Kiehl ............................. 29/505 |
| 2009/0101634 | A1 | * | 4/2009 | Meier ........................... 219/617 |
| 2010/0040455 | A1 | * | 2/2010 | Hanrieder et al. ............ 415/115 |

FOREIGN PATENT DOCUMENTS

| | | |
|---|---|---|
| FR | 2 629 133 | 9/1989 |
| WO | WO 00/03834 | 1/2000 |

* cited by examiner

COMPONENT AND METHOD FOR JOINING METAL ELEMENTS

This is a national phase of International Application No. PCT/DE2007/000456, filed Mar. 14, 2007, which claims priority to German Application No. 10 2006 012 660.2, filed Mar. 20, 2006.

FIELD OF THE INVENTION

The present invention relates to a component, in particular a component of a gas turbine, composed of at least two metallic structural elements, the first structural element having a first joining surface and the second structural element having a second joining surface, and the structural elements being joined via their joining surfaces by an inductive high-frequency pressure welding. The present invention also relates to a method for joining metallic structural elements, in particular structural elements of a gas turbine, an inductive high-frequency pressure welding being used to join corresponding joining surfaces of the structural elements.

BACKGROUND

Various methods for joining metallic structural elements by inductive high-frequency pressure welding are known from the related art. Thus, for example, the German Patent Application DE 198 58 702 A1 describes a method for joining blade parts of a gas turbine, one blade section and at least one further blade part being provided. In this context, corresponding joining surfaces of these elements are essentially mutually aligned while allowing for spacing therebetween; are subsequently welded together by the action of an inductor excited by high-frequency current; and are then driven together with mutual contacting of the joining surfaces thereof. The inductor is excited using a constant frequency which is generally above 0.75 MHz. In addition, the frequency is selected as a function of the geometry of the joining surfaces. When working with inductive high-frequency pressure welding, it is critical to the quality of the join that the two welding partners be heated simultaneously and homogeneously. Moreover, a uniform upsetting deformation of the join region must be ensured in order to obtain a welded connection that is free of defects. However, the disadvantage of the known methods is that it is precisely the last mentioned condition that can only be met with great difficulty or not at all. Thus, the requisite quality for the resulting components and, in particular, for the joins thereof is not always attainable.

SUMMARY OF THE INVENTION

It is, therefore, an object of the present invention to devise a component of the species, which, on the one hand, will ensure a secure and durable bond between the individual structural elements and, on the other hand, a high quality of the joins among the structural elements.

It is also an object of the present invention to devise a method of the species for joining metallic structural elements, which, on the one hand, will ensure a secure and durable bonding of structural elements and, on the other hand, a high quality of the joins among the structural elements.

It is expressly mentioned for clarification in this case that the inductive high-frequency pressure welding designation does not stipulate a specific frequency range for the method, respectively the component. Rather, frequencies in the low kHz range up to the high MHz range are used, so that the new designation of inductive pressure welding (IPS) may also be introduced.

A component according to the present invention, in particular a component of a gas turbine, is composed of at least two metallic structural elements, the first structural element having a first joining surface, and the second structural element having a second joining surface, and the structural elements being joined via their joining surfaces by an inductive high-frequency pressure welding. In this context, one of the joining surfaces is shaped to widen peripherally in comparison to the other joining surface, an upsetting deformation produced in a join region in response to the joining of the structural elements, resting virtually entirely within and, in particular, on a peripheral collar formed by the peripheral widening of the one joining surface. In accordance with the present invention, the peripheral widening of the one joining surface ensures a uniform upsetting deformation of the join region, so that a defect-free welded connection is obtained. Thus, not only is a secure and durable bond between the individual structural elements ensured, but also a high quality of the resulting components and, in particular, of the joins of these components. As a result of the uniform upsetting deformation, the join region is free of notches, cracks, or of any other defects that affect strength, in particular, following an optional finish-machining.

The widening preferably results in a joining surface having a substantially constant width. This makes it possible to adapt the frequency used in the joining process more readily to the process.

In one advantageous embodiment of the component according to the present invention, a notch in the upsetting deformation that is formed in a region of transition to the joining surface of the peripheral widening, is situated outside of a nominal geometry of the two structural elements, respectively of the joined-together component. This ensures that the notches that form in response to the upsetting deformation are always located outside of the actual component, thereby also avoiding any defects that affect strength. In one advantageous embodiment of the component, the peripheral widening amounts to at least 0.5 mm. In this context, the magnitude of the component widening, respectively of the collar is dependent on the cross section of the structural element, respectively of the joining surface of the structural element. Given a cross-sectional area of approximately 40 mm$^2$, the peripheral widening is typically 0.5 mm. Given cross-sectional areas in the region of 500 mm$^2$, the magnitude of the peripheral widening may amount to 1.0 mm or more.

In another advantageous embodiment of the component according to the present invention, the first joining surface is peripherally widened in a mechanical process by the application of force. Moreover, to effect peripheral widening, an attachment element may be joined to the first structural element, the attachment element having a joining surface that is designed to widen peripherally in comparison to the joining surface of the second structural element. The attachment element is typically welded to the first structural element. It is thus possible for the structural elements to be used not only to produce new components, but also to repair damaged components, while incorporating the advantages of the present invention.

Another advantageous embodiment of the component according to the present invention provides for at least two different frequencies induced by at least one inductor to be used during the inductive high-frequency pressure welding to heat the joining surfaces of the structural elements. This ensures a uniform and homogenous heating of the differentsized joining surfaces. Moreover, structural elements made of similar or also of different metallic materials may be joined together.

In one advantageous embodiment of the component according to the present invention, the second structural element is a blade or a part of a blade of a rotor in a gas turbine, and the second structural element is a ring or a disk of the rotor or a blade stump configured at the periphery of the ring or the disk. These components that have been joined together from the mentioned structural elements, are what are commonly referred to as BLINGs ("bladed rings") or BLISKs ("bladed disks") of gas turbine engines.

A method according to the present invention for joining metallic structural elements, in particular structural elements of a gas turbine, provides that an inductive high-frequency pressure welding be used to join corresponding joining surfaces of the structural elements. In this context, the joining surfaces are pressed together in a sufficiently heated state and held until cooled, one of the joining surfaces being shaped to widen peripherally in comparison to the other joining surface, an upsetting deformation produced in a join region in response to the joining of the structural elements, resting virtually entirely within and, in particular, on a peripheral collar formed by the peripheral widening of the one joining surface. The cast structure produced by the welding is completely removed by pressing out the molten material. This ensures a secure and durable bond between the structural elements. Moreover, a very high quality is attained for the join, respectively for the join region of these components, since a uniform upsetting of the join region is possible. Since the welded connection is free of defects, the join region is free of notches, cracks, or of any other defects, respectively cast structures that affect strength, in particular following an optional finish-machining. Since it is only necessary that one of the joining surfaces be shaped to widen peripherally, the method may be employed both for new parts manufacturing, which requires a relatively substantial over-allowance for the finish machining, as well as for repairs, which do not require an over-allowance.

Preferably, the widening process will effect a substantially constant width for the joining surface. This makes it possible for the frequency to be more readily adapted to the particular circumstances.

In another advantageous embodiment of the method according to the present invention, a notch formed in a region of transition to the joining surface of the peripheral widening in response to the upsetting deformation is situated outside of a nominal geometry of the two structural elements, respectively of the component. This ensures, in turn, that, upon completion of the component, the join region is free of potential defects that could affect strength. In the method according to the present invention, the one joining surface widens peripherally by at least 0.5 mm, the magnitude of the peripheral widening conforming to the diameter or the cross-sectional area of the joining surfaces to be joined. Thus, given a cross-sectional area of approximately 40 mm$^2$, the size of the peripheral collar, respectively of the widening, is approximately 0.5 mm. Given a cross-sectional area of approximately 500 mm$^2$, the peripheral widening may amount to approximately 1.0 mm or more.

In other advantageous embodiments of the method according to the present invention, the first joining surface is peripherally widened in a mechanical process by the application of force or by an attachment element that is joined to the first structural element and that has a joining surface which is designed to widen peripherally in comparison to the joining surface of the second structural element. Thus, the method according to the present invention may also be employed for repairing damaged components. Cited as an example in this context is the reconditioning of what are commonly referred to as BLISKs ("bladed disks") and BLINGs ("bladed rings"), which require a partial or complete blade exchange. The attachment element referred to is typically welded to the first structural element. Different types of welding processes, such as keyhole welding or laser welding, may be used, for example. In the described fields of application of the method according to the present invention, the second structural element is a blade or a part of a blade of a rotor in a gas turbine; and the first structural element is a ring or a disk of the rotor or a blade stump configured at the periphery of the ring or the disk.

Another advantageous embodiment of the method according to the present invention provides for at least two different frequencies induced by at least one inductor to be used during the inductive high-frequency pressure welding to heat the joining surfaces of the structural elements. This ensures a uniform and homogenous heating of the joining surfaces having different cross-sectional areas. The result is a secure and durable bond between the two structural elements.

BRIEF DESCRIPTION OF DRAWINGS

Other advantages and features of the present invention and details pertaining thereto are derived from the following description of two graphically illustrated exemplary embodiments. Specifically.

DETAILED DESCRIPTION

Figure 1:
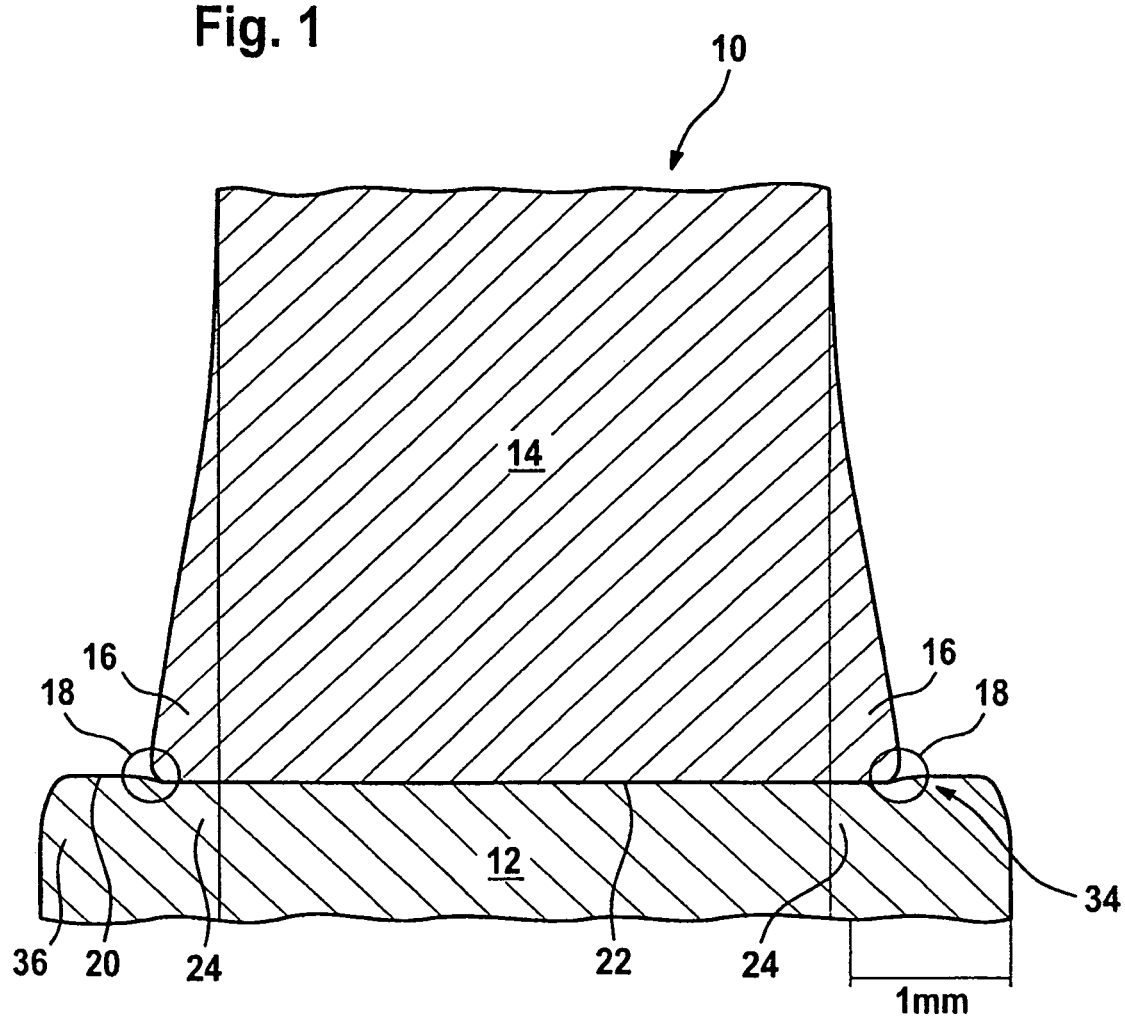
FIG. 1 shows a representation of a microsection through a join region of a component according to the present invention in accordance with a first specific embodiment.

FIG. 1 shows a microsection through a join region 34 of a component 10. It is discernible that component 10 is composed of a first structural element 12 and a second structural element 14 that have been joined together via their joining surfaces 20, 22 by an inductive high-frequency pressure welding. In this context, first joining surface 20 is shaped to widen peripherally in comparison to second joining surface 22 and thereby forms a collar, respectively a peripheral widening 36. It is also discernible that an upsetting deformation 16 produced in a join region 34 in response to the joining of structural elements 12, 14 rests entirely within and, in particular, on a peripheral collar 36 formed by the peripheral widening of first joining surface 20. In this context, in a region of transition to joining surface 20 having the peripheral widening, respectively collar 36, upsetting deformation 16 has a notch 18, notch 18 residing outside of a nominal geometry 24 of the two structural elements 12, 14, respectively of component 10.

The micrograph clearly shows the form and effect of the widening of the one joining partner, namely of first structural element 12, respectively of first joining surface 20 of first structural element 12. Upsetting deformation 16 resulting from the joining process may be intentionally outwardly directed on the peripheral widening of first joining surface 20, so that notch 18 formed during the joining process is situated outside of nominal geometry 18 of component 10.

Figure 2:
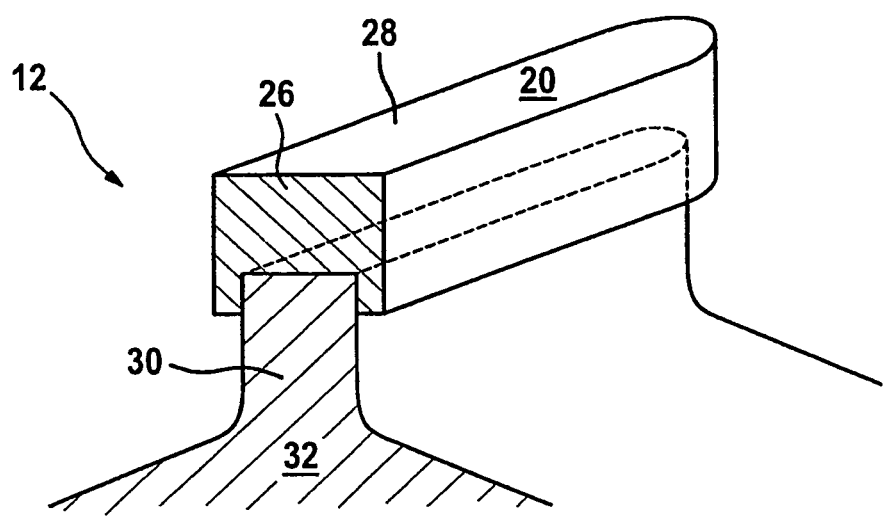
FIG. 2 shows a schematic representation of a portion of a component according to the present invention in accordance with a second specific embodiment.

FIG. 2 shows a schematic representation of first structural element 12 of a component 10 in accordance with a second specific embodiment. It is discernible that first component 12 is constituted of a partial element 30, namely of a blade stump formed on the periphery of a rotor 32, and of an attachment element 28 that is joined thereto. In this context, an attachment element body 26 is designed to be wider than blade stump 30. In addition, attachment element 28 has a joining surface 20 that is designed to widen peripherally in comparison to joining surface 22 of second structural element 14 (not shown in this exemplary embodiment). In this context, attachment element 28 is welded to partial element 30 of first structural element 12.

When the exemplary embodiments are considered, it becomes apparent that the method according to the present invention, as well as structural elements 12, 14 are suited both for manufacturing, as well as for repairing components 10 of a gas turbine.

What is claimed is:

1. A component comprising at least two metallic structural elements, a first structural element having a first continuous joining surface, and a second structural element having a second continuous joining surface, the first and second structural elements being joined via the first and second continuous joining surfaces by an inductive high-frequency pressure welding,
wherein the first continuous joining surface has a shape that is peripherally widened in comparison to the second continuous joining surface, and an upsetting deformation produced in a join region in response to the joining of the first and second structural elements rests virtually entirely within and on a continuous peripheral collar formed by the peripheral widening of the first continuous joining surface; and
wherein at a junction of the second continuous joining surface and the first continuous joining surface, the upsetting deformation has a notch; the notch residing outside of a nominal geometry of the first and second structural element of the component.

2. The component as recited in claim 1, wherein the component is a component of a gas turbine.

3. The component as recited in claim 1, wherein the first continuous joining surface has a substantially constant width as a result of the peripheral widening.

4. The component as recited in claim 1, wherein the peripheral widening amounts to at least 0.5 mm.

5. The component as recited in claim 1, wherein the peripheral widening of the first continuous joining surface is produced mechanically by the application of force.

6. The component as recited in claim 1, wherein, to effect peripheral widening, an attachment element is joined to a partial element of the first structural element; the attachment element having the first continuous joining surface that is designed to widen peripherally in comparison to the second continuous joining surface of the second structural element.

7. The component as recited in claim 6, wherein the attachment element is welded to the partial element of the first structural element.

8. The component as recited in claim 1, wherein at least two different frequencies induced by at least one inductor are used during the inductive high-frequency pressure welding process to heat the first and second continuous joining surfaces of the first and second structural elements.

9. The component as recited in claim 1, wherein the first and the second structural elements are made of different or similar metallic materials.

10. The component as recited in claim 1, wherein the second structural element is a blade or a part of a blade of a rotor in a gas turbine, and the first structural element is a ring or a disk of the rotor or a blade stump configured at the periphery of the ring or the disk.

11. The component as recited in claim 1, wherein the component is a BLING or a BLISK.

12. The component of claim 1, wherein the collar is a raised collar.

13. A method for joining metallic structural elements comprising:
providing a first structural element having a first continuous joining surface and a second structural element having a second continuous joining surface, the first continuous joining surface having a shape that is peripherally widened in comparison to the second continuous joining surface;
performing inductive high-frequency pressure welding to join the first and second structural elements at the first and second continuous joining surfaces;
pressing together the first and second continuous joining surfaces in a sufficiently heated state during said welding and holding the first and second continuous joining surfaces together until cooled;
wherein during said welding of the first and second structure elements at the first and second continuous joining surfaces, an upsetting deformation is formed in a join region between the first and second structural elements, the upsetting deformation resting virtually entirely within and on a continuous peripheral collar formed by the peripheral widening of the first continuous joining surface; and
wherein, during said welding of the first and second structural elements at the first and second continuous joining surfaces, in a region of transition to the first continuous joining surface having the peripheral widening, a notch is formed in the upsetting deformation, the notch being situated outside of a nominal geometry of the first and second structural elements of the component.

14. A method as recited in claim 13, wherein the metallic structural elements are structural elements of a gas turbine.

15. The method as recited in claim 13, wherein the first continuous joining surface has a substantially constant width.

16. The method as recited in claim 13, wherein the peripheral widening amounts to at least 0.5 mm.

17. The method as recited in claim 13, wherein the peripheral widening of the first continuous joining surface is produced mechanically by the application of force.

18. The method as recited in claim 13, wherein, the step of providing further comprises joining an attachment element to a partial element of the first structural element, the attachment element having the first continuous joining surface that is peripherally widened in comparison to the second continuous joining surface of the second structural element.

19. The method as recited in claim 18, wherein the attachment element is welded to the partial element of the first structural element.

20. The method as recited in claim 13, wherein the second structural element is a blade or a part of a blade of a rotor in a gas turbine, and the first structural element is a ring or a disk of the rotor or a blade stump configured at the periphery of the ring or the disk.

21. The method as recited in claim 13, wherein the component is a BLING or a BLISK.

22. The method as recited in claim 13, wherein the step of inductive high-frequency pressure welding includes using at least two different frequencies induced by at least one inductor to heat the first and second continuous joining surfaces of the first and second structural elements.

23. The method of claim 13, wherein the collar is a raised collar.

* * * * *